United States Patent
Borkowski et al.

(10) Patent No.: US 10,415,752 B2
(45) Date of Patent: Sep. 17, 2019

(54) BOSS ASSEMBLY FOR COMPOSITE CYLINDER

(71) Applicant: Worthington Industries, Inc., Columbus, OH (US)

(72) Inventors: Wojciech Janusz Borkowski, Wroclaw (PL); Stanislaw Kubicz, Sycewice (PL)

(73) Assignee: WORTHINGTON INDUSTRIES, INC., Columbus, OH (US)

( * ) Notice: Subject to any disclaimer, the term of this patent is extended or adjusted under 35 U.S.C. 154(b) by 302 days.

(21) Appl. No.: 15/450,493

(22) Filed: Mar. 6, 2017

(65) Prior Publication Data

US 2018/0252363 A1  Sep. 6, 2018

(51) Int. Cl.
*F17C 1/16* (2006.01)
*F17C 1/06* (2006.01)
(Continued)

(52) U.S. Cl.
CPC ............. *F17C 1/06* (2013.01); *B29C 69/02* (2013.01); *F17C 1/16* (2013.01); *F17C 13/04* (2013.01); *B29C 70/32* (2013.01); *B29C 70/68* (2013.01); *B29L 2031/7156* (2013.01); *F17C 2201/0104* (2013.01); *F17C 2201/0109* (2013.01); *F17C 2201/056* (2013.01); *F17C 2203/0604* (2013.01); *F17C 2203/066* (2013.01); *F17C 2203/0617* (2013.01); *F17C 2203/0619* (2013.01); *F17C 2203/0663* (2013.01); *F17C 2203/0685* (2013.01); *F17C 2205/0305* (2013.01); *F17C 2205/0323* (2013.01); *F17C 2209/2154* (2013.01); *F17C 2209/228* (2013.01); *F17C 2221/012* (2013.01);
(Continued)

(58) Field of Classification Search
CPC .... F17C 1/06; F17C 1/16; F17C 13/04; F17C 2201/0104
USPC ........................................................ 220/589
See application file for complete search history.

(56) References Cited

U.S. PATENT DOCUMENTS

| | | | |
|---|---|---|---|
| 5,253,778 A | 10/1993 | Sirosh | |
| 5,429,845 A | 7/1995 | Newhouse et al. | |
| 6,186,356 B1 * | 2/2001 | Berkley | F17C 1/00 220/304 |

FOREIGN PATENT DOCUMENTS

| | | |
|---|---|---|
| DE | 202012101004 | 6/2013 |
| EP | 664418 | 7/1995 |

(Continued)

OTHER PUBLICATIONS

Invitation to Pay Additional fees and, where applicable, protest fee and Annex to Form PT/ISA/206 Communication relating to the results of the partial international search; PCT/US2017/020917; dated Dec. 14, 2017.

*Primary Examiner* — King M Chu
(74) *Attorney, Agent, or Firm* — Tucker Ellis LLP; Carlos Garritano (57) ABSTRACT

Provided is a system and method for securing a seal between a thermoplastic liner and a metal boss for a composite cylinder. A metal boss can be integrated with a thermoplastic liner during a molding process. A bushing can be inserted into the metal boss and coupled thereto via threading. The bushing can further include a relief space region having a sidewall that is deformed from a first position to a second position in order to decrease a distance of the metal boss to the sidewall of the bushing, wherein the decrease provides a seal between the metal boss and the thermoplastic liner.

18 Claims, 9 Drawing Sheets

(51) Int. Cl.
  *F17C 13/04*   (2006.01)
  *B29C 69/02*   (2006.01)
  *B29C 70/32*   (2006.01)
  *B29C 70/68*   (2006.01)
  *B29L 31/00*   (2006.01)

(52) U.S. Cl.
  CPC .. *F17C 2221/014* (2013.01); *F17C 2221/031* (2013.01); *F17C 2221/033* (2013.01); *F17C 2221/035* (2013.01); *F17C 2223/0123* (2013.01); *F17C 2223/035* (2013.01); *F17C 2260/036* (2013.01); *F17C 2270/01* (2013.01); *F17C 2270/0168* (2013.01); *Y02E 60/321* (2013.01)

(56) References Cited

FOREIGN PATENT DOCUMENTS

| | | |
|---|---|---|
| PL | 194323 | 2/1998 |
| WO | 2014121935 | 8/2014 |
| WO | 2017015536 | 1/2017 |

\* cited by examiner

BOSS ASSEMBLY FOR COMPOSITE CYLINDER

CROSS-REFERENCE TO RELATED APPLICATIONS

This application relates to U.S. Provisional Patent Application Ser. No. 62/311,970 filed on Mar. 23, 2016 entitled "BOSS AND LINEAR INTERFACE FOR A PRESSURE VESSEL." This application claims priority to and the benefit of Polish Patent Application Ser. No. P. 420 733 filed on Mar. 3, 2017. The entireties of such applications are incorporated herein by reference.

TECHNICAL FIELD

Embodiments of the subject matter disclosed herein relate to cylinders that store or house gas, and in particular, composite cylinders.

DISCUSSION OF ART

Cylinders are defined based on standardized types of which there are five (5). Type I cylinders are steel or metal vessels, type II are metal vessels with reinforcement on the cylindrical part, type III have a metal internal part (e.g., a liner) with reinforcement fully on the liner, type IV have a thermoplastic liner reinforced with composite fully on the liner, and type V are composite pressure vessels that are produced without liners (e.g., linerless cylinders). Each type (e.g., I, II, III, IV, or V) of cylinder or pressure vessel has respective requirements and standards. Typically, the weak element of type IV composite vessels are the connections between the thermoplastic liner and any metal parts.

It may be desirable to have a cylinder or pressure vessel that differ from those that are currently available.

BRIEF DESCRIPTION

In an embodiment, a cylinder that is configured to house a gas is provided that includes a thermoplastic liner having a closed end and an open end opposite thereto. The cylinder can further include a metal boss having a first end, a second end opposite thereto, an internal wall that defines a through passage that extends between the first end and the second end, and an internal thread on a portion of the internal wall, wherein the second end is coupled to the open end of the thermoplastic liner. The cylinder can include a bushing having a first end, a second end opposite thereto, an internal wall that defines a through passage that extends between the first end and the second end, and an external wall having an external thread configured to engage the internal thread of the metal boss for connectivity, wherein the bushing is configured to fit inside the through passage of the metal boss. The bushing of the cylinder can further include a relief space region having a sidewall at a first position that is deformable to a second position which reduces a distance between the sidewall and the metal boss.

In an embodiment, a method of fabricating a composite cylinder can be provided that includes at least the steps of: integrating a metal boss into a thermoplastic liner by using a molding technique; coupling a bushing inside the metal boss; inserting an O-ring between the metal boss and the bushing; expanding a relief space region of the bushing from a first position to a second position, wherein the second position is a position that has a reduced distance between the metal boss and the bushing and the step of expanding the relief space region reduces a length of the bushing; coupling a valve inside the bushing; and performing a winding process on an exterior of the thermoplastic liner and a portion of the metal boss.

In an embodiment, a bushing for a cylinder can include the following: a first end, a second end opposite thereto, an internal wall that defines a through passage that extends between the first end and the second end, and an external wall having an external thread configured to engage an internal thread of a metal boss for connectivity, wherein the bushing is configured to fit inside the through passage of the metal boss; and a relief space region having a sidewall at a first position that is deformable to a second position which reduces a distance between the sidewall and the metal boss.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Embodiments of the provided subject matter relate to methods and systems for securing a seal between a thermoplastic liner and a metal boss for a composite cylinder. A metal boss can be integrated with a thermoplastic liner during a molding process. A bushing can be inserted into the metal boss and coupled thereto via threading. The bushing can further include a relief space region having a sidewall that is deformed from a first position to a second position in order to decrease a distance of the metal boss to the sidewall of the bushing, wherein the decrease provides a seal between the metal boss and the thermoplastic liner.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "vehicle" as used herein may be a mobile machine or a moveable transportation asset that transports at least one of a person, people, or a cargo. For instance, a vehicle can be, but is not limited to being, semi, a semi truck, a semi-trailer truck, a tractor-trailer, a transfer truck, an 18-wheeler, a truck, a class 8 vehicle, an automobile, farm equipment, industrial equipment, construction equipment, van, Sport Utility Vehicle (SUV), a truck that carriers a load and/or freight, and the like. The term "container," "cylinder," or "pressure vessel" as used herein can be defined as any tank, housing, canister, and the like of any suitable material that can house or contain a portion of material, wherein the material can be, but is not limited to, a liquid, a gas, an alternative fuel, a solid, a plasma, or a combination thereof.

Figure 1:
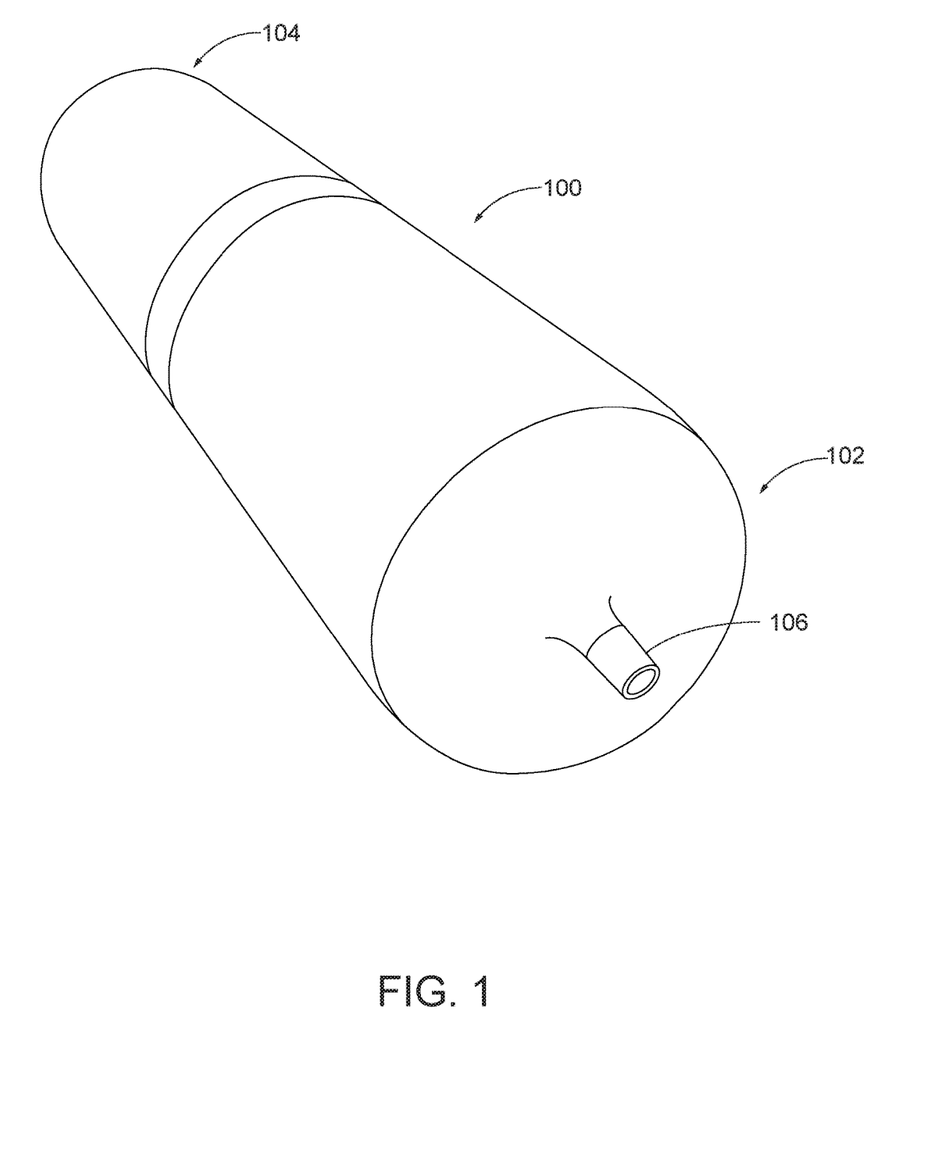
FIG. 1 illustrates a cylinder in accordance with the subject innovation.

Turning to FIG. 1, a cylinder 100 is illustrated as used in accordance with the subject innovation. The cylinder 100 can include a first end 102, a second end opposite thereto 104, and a neck 106. The neck 106 can be configured to receive a valve or fitting that enables filling or dispensing of a portion of material. The cylinder 100 can be cylindrical in shape with a length, a diameter, and a thickness. Yet, it is to be appreciated that the cylinder 100 shape or size can be chosen with sound engineering judgment without departing from the intended scope of coverage of the embodiments of the subject invention. The cylinder 100 can include one or more liners of a material. For instance, the cylinder 100 can include a liner 108 (shown in FIGS. 10 and 11) made of a first material. In certain embodiments, the first material is at least one of a plastic, a metal, a steel, a thermoplastic, among others. In certain embodiments, the cylinder 100 can include a wrapping 110 (shown in FIGS. 10 and 11) of a second material. In certain embodiments, the second material is at least one of a carbon fiber, a composite material, a Teflon, or a disparate material from the first material. In certain embodiments, the cylinder 100 is made of at least one of a metal, a plastic, a polymer, or a composite material.

The cylinder 100 can include a closed end and an open end opposite thereto, wherein the open end is integrated with at least one of a boss, a neck, a valve, an opening configured to couple to a valve, among others. It is to be appreciated that the open end on the cylinder 100 can be configured to receive material that is stored in the cylinder 100 and/or configured to dispense material that is stored in the cylinder 100, wherein the dispensing/receiving is with a component such as a valve, port, and the like.

It is to be appreciated that the cylinder 100 can include a first valve on a first end and an addition valve on a second end opposite thereto. Moreover, it is to be appreciated that the cylinder 100 can include one or more chambers within to house one or more materials. For example, a cylinder can be segmented to have a first chamber that houses a first material filled/dispensed with a first valve on the first end and a second chamber that houses a second material filled/dispensed with a second valve on a second end opposite to the first end.

It is to be appreciated that the cylinder 100 can house a portion of a material, wherein the material can be a solid, a gas, a liquid, a plasma, among others. By way of example and not limitation, the material can be an alternative fuel. In still another example that is not limiting on the subject innovation, the material can be a material at a high pressure in comparison to an atmospheric pressure.

In still another example, one or more cylinders 100 can be used with a fuel system for a vehicle. For example, in addition to compressed natural gas, the cylinder 100 can be utilized with a fuel system that utilizes or consumes renewable fuel sources, nonrenewable fuel sources, liquid fuel sources, or gas fuel sources for a vehicle, wherein the cylinder 100 can store such renewable fuel sources, nonrenewable fuel sources, liquid fuel sources, or gas fuel sources. Renewable fuel sources can include biofuels such as vegetable oil, ethanol, methanol, butanol, other bioalcohols, biomass, or biodiesel, among others. Renewable fuel sources can also include hydrogen and/or hydrogen fuel cells, refuse-derived fuel, chemically stored fuel, non-fossil methane, non-fossil natural gas, Ammonia, Formic acid, liquid Nitrogen, compressed air, or propane derived from renewable methods, among others. Nonrenewable fuel source can include gasoline, propane, or diesel, among others. Additional liquid or gas fuel sources can include any mixture or blend of energy sources, for example, E10, E15, E30, or E85 fuel, or HCNG (blend of compressed natural gas with Hydrogen). It is be appreciated that the cylinder 100 can house a material chosen with sound engineering judgment without departing from the intended scope of coverage of the embodiments of the subject invention and such material can be used for a fuel system of a vehicle, a machine, a device, or any combination thereof.

Figure 2:
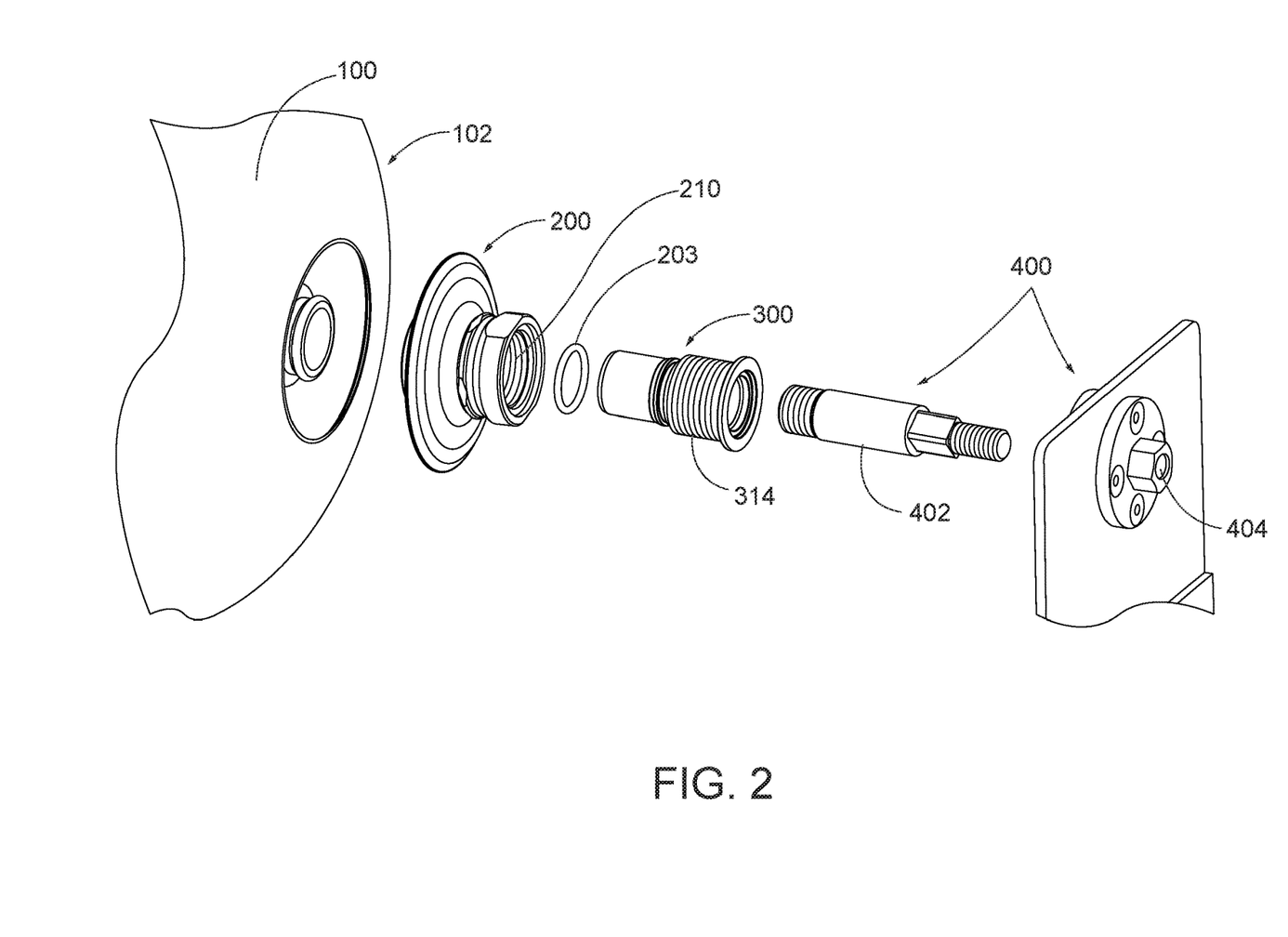
FIG. 2 illustrates an exploded view of a metal boss, a bushing, an O-ring, and a tool system.

FIG. 2 is an exploded view that illustrates the cylinder 100 at the first end 102, a metal boss 200, a bushing 300, an O-ring 203, and a tool system 400. The metal boss 200 can be integrated into the cylinder 100 via a molding process during which the metal boss 200 is integrated to the thermoplastic liner of the cylinder 100. In particular, the cylinder 100 can include an open end, a closed end opposite thereto, wherein the metal boss 200 is integrated and coupled to the open end. The metal boss 200 is affixed to the open end of the liner of the cylinder 100 to provide connectivity in an airtight seal (as described in more detail below).

Figure 5:
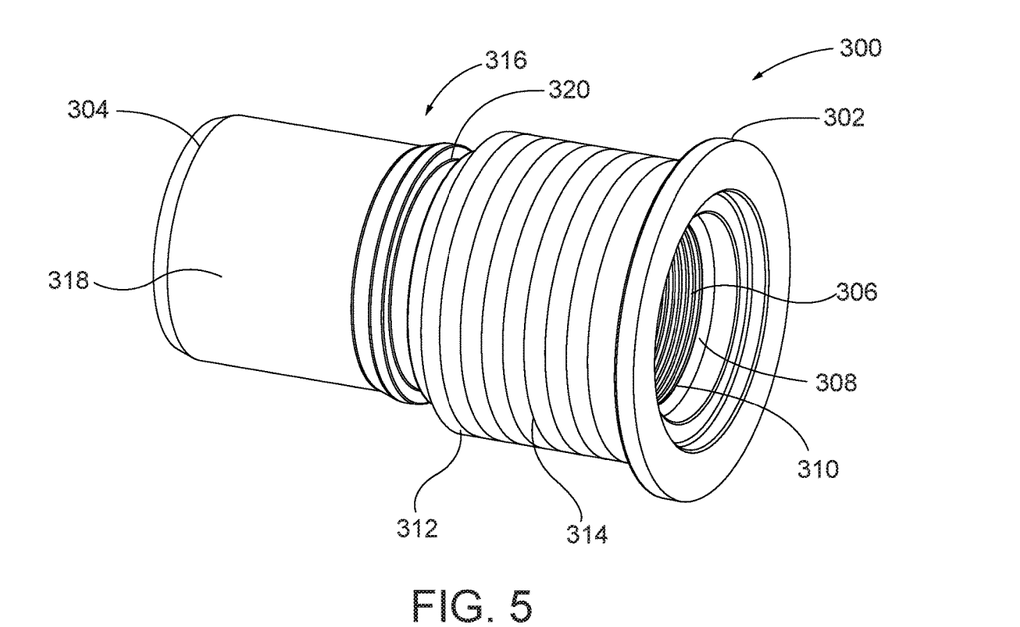
FIG. 5 illustrates an embodiment of a bushing in accordance with the subject innovation.
Figure 6:
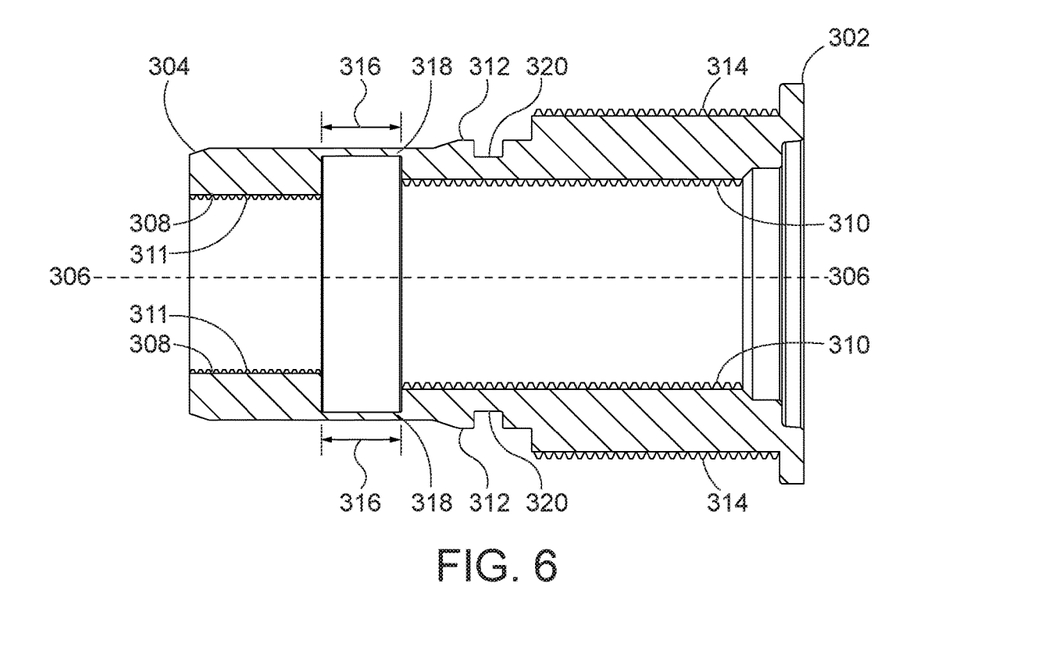
FIG. 6 illustrates a cross-sectional view of the embodiment of the bushing illustrated in FIG. 5.
Figure 7:
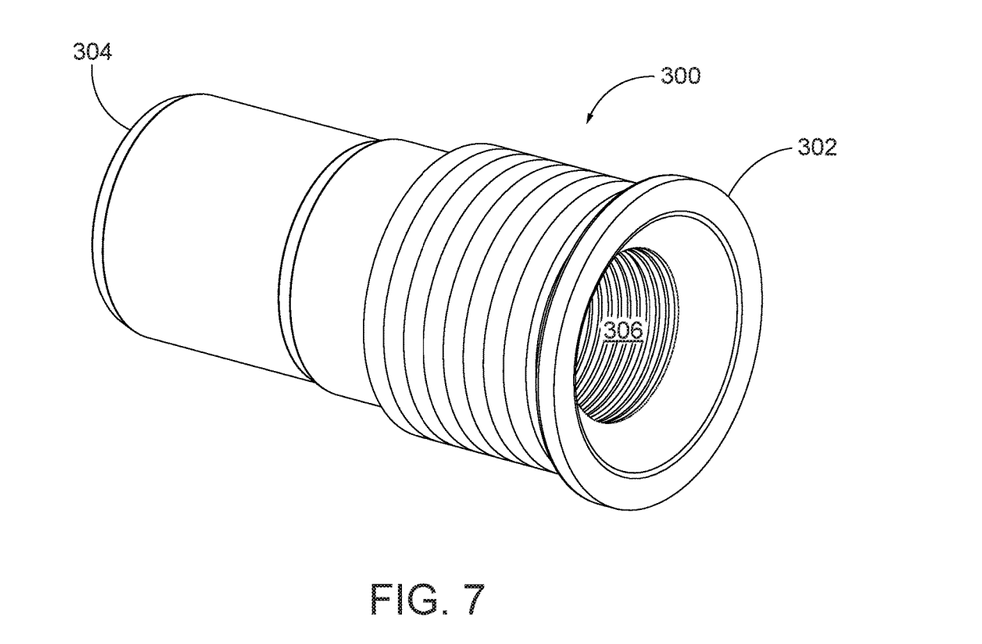
FIG. 7 illustrates an embodiment of a bushing in accordance with the subject innovation.
Figure 8:
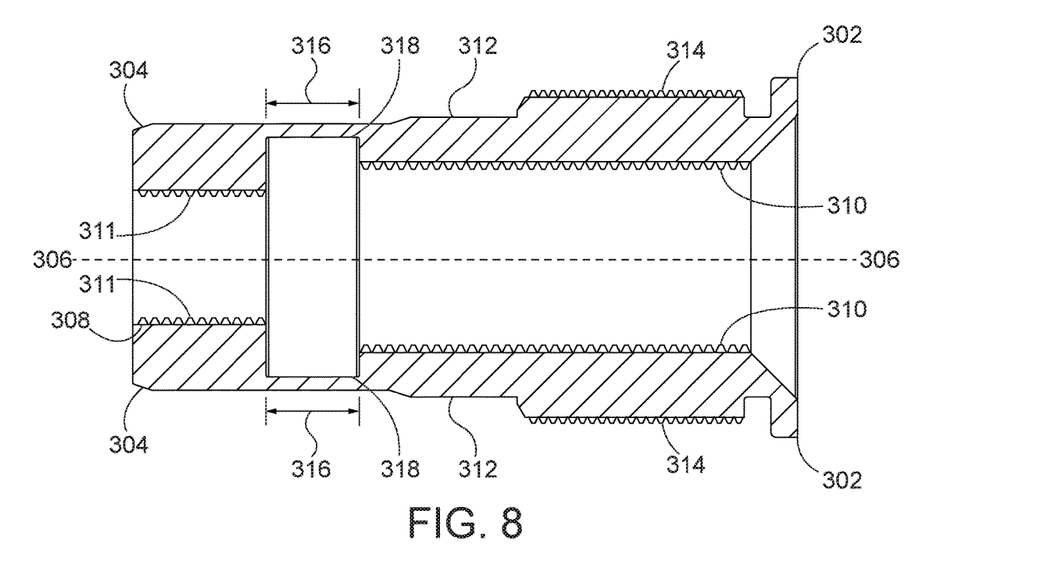
FIG. 8 illustrates a cross-sectional view of the embodiment of the bushing illustrated in FIG. 7.

FIG. 2 further illustrates the O-ring 203 that can be inserted into the interior wall of the metal boss 200 (using a bushing that is illustrated in FIGS. 7 and 8) or placed on the exterior of the bushing 300 (using a bushing illustrated in FIGS. 5 and 6). It is to be appreciated that one or more O-rings can be utilized with the subject innovation. The bushing 300 is configured to fit inside the metal boss 200 and be coupled thereto via an external thread 314 on the bushing 300 that mates with an internal thread 210 on the metal boss 200. The bushing 300 further includes a relief space region 316 having a sidewall 318 at a first position 1002 (illustrated in FIG. 10) that is deformable to a second position 1004 (illustrated in FIG. 11), wherein the deformation expands the sidewall 318 to reduce a distance between the sidewall 318 and the metal boss 200. Further, the thermoplastic liner of the cylinder 100 is crimped between the sidewall 318 and the metal boss 200 when the sidewall 318 is in the second position 1004 (illustrated in FIG. 11).

The tool system 400 can be utilized to deform the bushing 300 from the first position to the second position allowing a distance from the metal boss 200 to the bushing 300 to decrease while creating an airtight seal at high pressure within the cylinder 100 relative to pressure outside the cylinder 100. Such aspects are described in more detail below.

Figure 3:
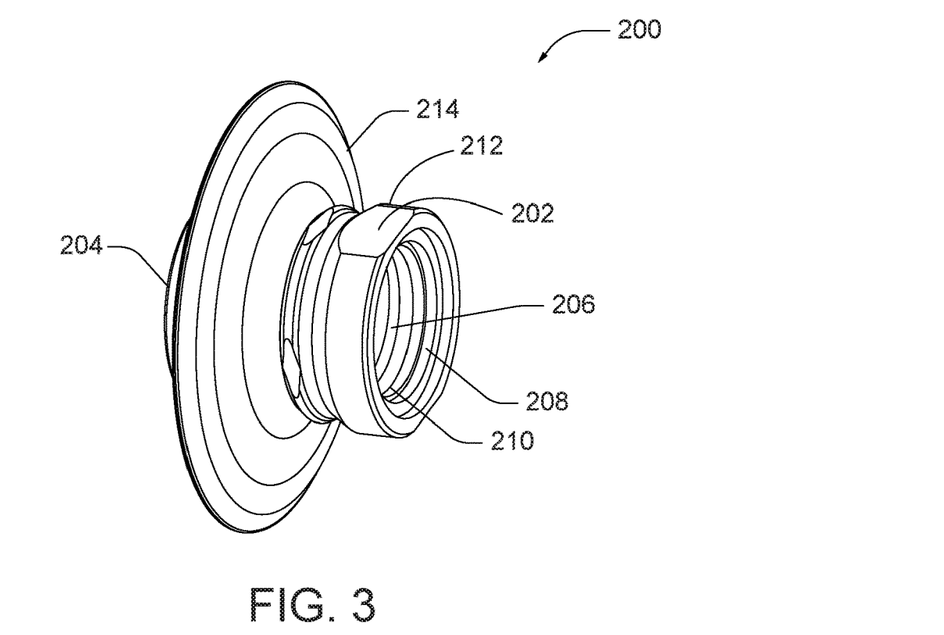
FIG. 3 illustrates a metal boss in accordance with the subject innovation.
Figure 4:
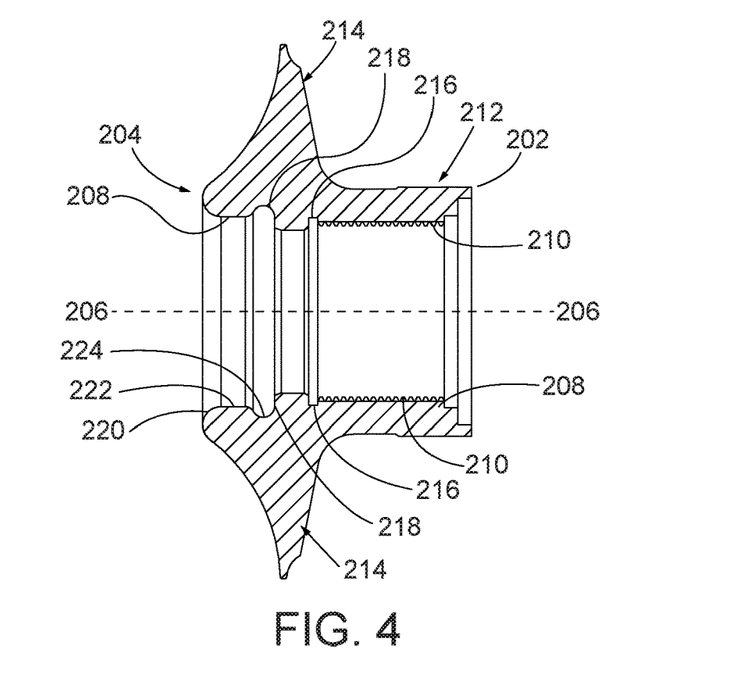
FIG. 4 illustrates a cross-sectional view of a metal boss.

Turning to FIG. 3 and FIG. 4, the metal boss 200 is illustrated and can be made of a metal such as, but not limited to, aluminum. FIG. 4 is a cross-sectional view of the metal boss 200. The metal boss 200 can be integrated into the first end 102 of the cylinder 100 during a molding process. It is to be appreciated that the molding process can be, but is not limited to, a blow molding technique, an injection molding technique, a rotational molding technique, a combination thereof, among others. Moreover, the metal boss 200 can include a first end 202 and a second end 204 opposite thereto in which a through passage 206 extends between the first end 202 and the second end 204. The metal boss 200 includes an internal thread 210 on an internal wall 208, wherein the internal thread 210 provides connectivity to an external thread 314 on an external wall 312 of the bushing 300. The metal boss 200 is configured to receive the bushing 300 within the through passage 206. The metal boss 200 further includes a collar portion 214 proximate to the second end 204 and a neck portion 212 proximate to the first end 202, wherein the collar portion 214 is integrated to the liner of the cylinder 100 during the molding process and the neck portion 212 that receives the bushing 300.

In an embodiment in which the O-ring is affixed to the metal boss 200 to facilitate sealing for the cylinder 100, the metal boss 200 can include one or more ribs. In an embodiment, the metal boss 200 can include a first rib 216 on the internal wall 208. In another embodiment, the metal boss 200 can include the first rib 216 and a second rib 218 on the internal wall 208 spaced apart from the first rib 216. In still another embodiment, the O-ring 203 can be positioned between the first rib 216 and the second rib 218.

As illustrated, the metal boss 200 can be integrated to the cylinder 100 (and in particular the thermoplastic liner). The integration during the molding process can create a channel region 230 (shown in FIGS. 10 and 11) based in part upon the shape of the second end 204 of the metal boss 200. As depicted, the second end 204 of the metal boss 200 can include a curved region 220 that connects to a neck region 222 that connects to lip region 224, wherein the thermoplastic liner fills to create the channel region 230. As depicted, the channel region 230 can be hook or hanger shaped but it is to be appreciated that the channel region 230 can be chosen with sound engineering judgment to provide a seal between the thermoplastic liner and the metal box 200. The channel region 230 can be aligned with the portion of the sidewall 318 of the relief space region 316 and a portion of the metal boss 200 such that upon deformation, the distance between the sidewall 318 and the metal boss 200 is reduced.

Turning to FIGS. 5-8, embodiments of the bushing 300 are illustrated and each includes a first end 302, a second end 304 opposite thereto, a through passage 306 in between the first end 302 and the second end 304, wherein the bushing 300 includes an internal wall 308 and the external wall 312. FIG. 5 illustrates a first embodiment of the bushing 300 that includes a gap 320 for an O-ring, wherein the bushing 300 (illustrated in FIG. 5) is used with the metal boss 200 when the O-ring is placed on the bushing 300. FIG. 6 is a cross-sectional view of an embodiment of the bushing 300 that includes the O-ring on an exterior surface of the bushing 300.

Turning to FIG. 7, a second embodiment of the bushing 300 is illustrated, wherein the O-ring is placed inside the metal boss 200 rather than in the gap 320 of the bushing 300 (illustrated in FIGS. 5 and 6). In other words, the bushing 300 is illustrated in FIG. 7 such that the O-ring is placed inside the metal boss 200. FIG. 8 is a cross-sectional view of an embodiment of the bushing 300 that includes the O-ring inside the metal boss 200. However, it is to be appreciated that the O-ring can be placed inside the metal boss 200, in the gap 320 of the bushing, or a combination thereof.

Referring back to FIGS. 5-8, the bushing 300 can include the external thread 314 on the external wall 312. Moreover, the bushing 300 can include a first internal thread 310 on the internal wall 308 and a second internal thread 311 on the internal wall 308. In particular, the first internal thread 310 can be proximate to the first end 302 and the second internal thread 311 can be proximate to the second end 304. The first internal thread 310 can be configured to couple to a valve for the cylinder 100, wherein the valve includes a thread that mates thereto. The second internal thread 311 can be configured to couple to the tool system 400 (discussed in more detail in FIG. 9) that deforms the bushing 300, and in particular, the sidewall 318 from a first position 1002 to a second position 1004.

As discussed, the bushing 300 includes the relief space region 316 having a sidewall 318 at a first position 1002 (shown in FIG. 10) and is deformable to a second position 1004 (shown in FIG. 11), wherein the second position of the sidewall 318 after deformation is expanded outwardly away from an axis of the bushing 300. The expansion of the sidewall 318 to the second position 1004 (shown in FIG. 11) increases a seal between the metal boss 200, the liner of the cylinder 100, and the bushing 300. For instance, the expansion of the sidewall 318 to the second position 1004 (shown in FIG. 11) can crimp the liner of the cylinder 100 to the metal boss 200. A distance from the metal boss 200 to the sidewall 318 is reduced while in the second position after deformation in comparison to the first position which increases sealing of the cylinder 100.

In an embodiment, the relief space region 316 can be positioned at a location that is in between the first internal thread 310 and the second internal thread 311. The position of the relief space region 316 can be chosen with sound engineering judgement without departing from the scope of the subject innovation. In another example, the relief space region 316 can have a space region length that is a portion of the length between the first end 302 and the second end 304 in reference to an axis of the bushing 300. The space region length can be configured to be reduced when a deformation of the sidewall 318 from the first position to the second position. In addition to the reduction in the space region length, the sidewall 318 is expanded outwardly at the second position.

It is to be appreciated that the thickness of bushing 300 can have a first thickness for a region of the second internal thread 311, a second thickness for a region of the relief space region 316, and a third thickness for a region of the first internal thread 310, wherein the second thickness is less than the first thickness or the third thickness. The second thickness can be configured such that the relief space region 316 can be a crumple region in which a length of the bushing 300, from first end 302 to second end 304, is reduced and the sidewall 318 is expanded outwardly (in reference from an axis of the through passage 306). By way of example and not limitation, the first thickness can be 0.0394 inches, the second thickness can be 0.0590 inches, and the third thickness can be 0.0797 inches.

As discussed above, the channel region 230 (shown in FIGS. 10 and 11) can be aligned with the portion of the sidewall 318 of the relief space region 316 and a portion of the metal boss 200 such that upon deformation, the distance between the sidewall 318 and the metal boss 200 is reduced. The deformation can allow the sidewall 318 expand into the channel region 230 which expands into a portion of the metal boss 200.

In an embodiment in which the O-ring is affixed to the bushing to facilitate sealing for the cylinder 100, the bushing 300 can include one or more ribs. In an embodiment, the bushing 300 can include a first rib 360 on the external wall 312. In another embodiment, the bushing 300 can include the first rib 360 and a second rib 362 on the external wall 312 spaced apart from the first rib 360. In still another embodiment, the O-ring 203 can be positioned between the first rib 360 and the second rib 362 on the bushing 300.

Figure 9:
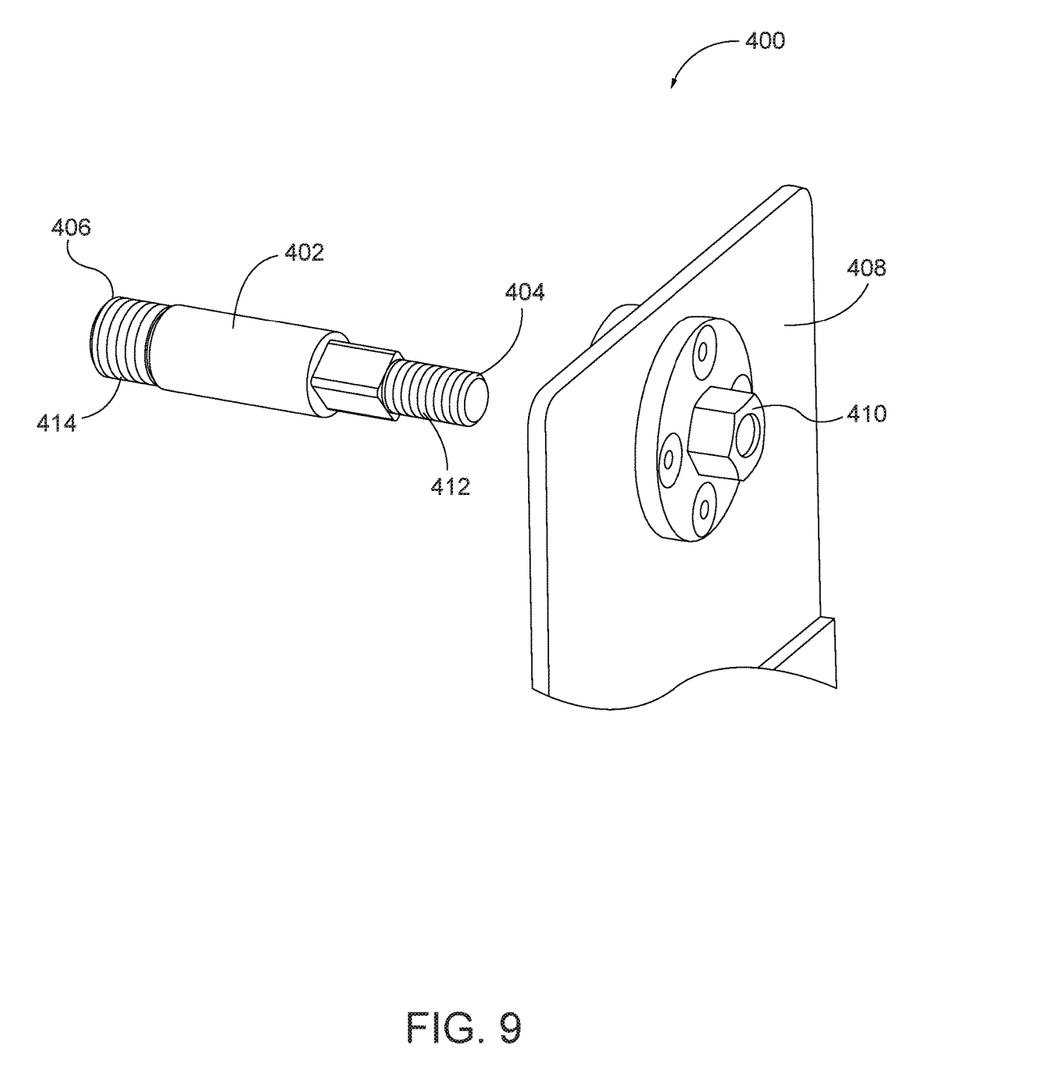
FIG. 9 illustrates a tool system utilized to have a sidewall of the bushing move from a first position to a second position.

Turning to FIG. 9, the tool system 400 is illustrated. The tool system 400 can include a rod 402 that includes a first end 404 and a second end 406 opposite thereto, wherein the first end 404 includes a first thread 412 that is configured to couple to a tightening bolt 410 secured to a plate 408. The second end 406 can include a second thread 414 that is configured to couple to the second internal thread 311 of the bushing 300.

The first end 404 of the rod 402 can affix to the second internal thread 311 of the bushing 300 to allow a longitudinal force to be applied in a direction from the second end 304 of the bushing 300 to the first end 302 of the bushing 300. This longitudinal force can cause a decrease in a length of the bushing 300 as well as cause the sidewall 318 to expand outwardly from an axis of the through passage 306 of the bushing 300.

In an embodiment, the tightening bolt 410 can affix to the first thread 412 of the rod 402 and upon tightening of the tightening bolt 410, the longitudinal force is applied. The longitudinal force can be applied from the tightening bolt 410, through the rod 402 which is connected to the second end 304 of the bushing 300. The longitudinal force is one that is in a direction from the second end 304 of the bushing 300 to the first end 302 of the bushing 300 (e.g., an axis of the through passage 306).

In another embodiment, the longitudinal force can be applied to the bushing 300 in a direction from the first end 302 of the bushing 300 to the second end 304 of the bushing 300, wherein such longitudinal force deforms the relief space region 316 from the first position to the second position. In still another embodiment, a force can be provided against the sidewall 318 in the relief space region 316 in a direction to expand the sidewall 318 outwardly.

It is to be appreciated that the longitudinal force can be applied by tightening the tightening bolt 410, a machine or tool that couples to the rod 402 to provide a longitudinal force, among others. In another embodiment, a machine that pinches or grabs the first end 404 of the rod 402 can be used rather than a tightening bolt 401 and/or the plate 408, wherein the machine provides a force along the longitudinal direction of the bushing 300. Moreover, it is to be appreciated that coupling the tool system 400 to the bushing 300 can be used with threads that mate with one another (as depicted), bolting, welding parts with one or more break welds, or a combination thereof.

Figure 10:
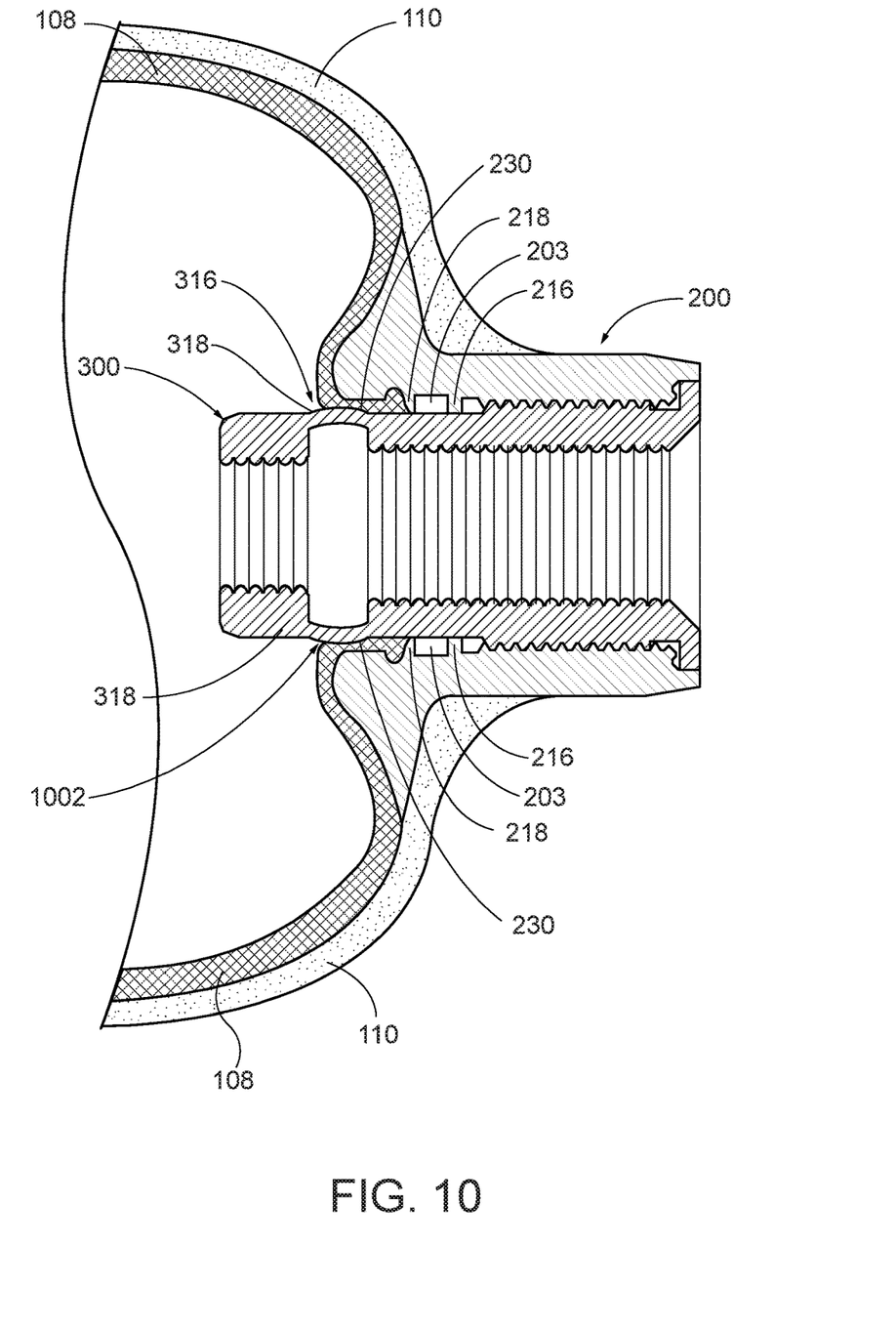
FIG. 10 illustrates an assembly of a bushing with a metal boss integrated into a liner in which a sidewall of the bushing is at a first position.
Figure 11:
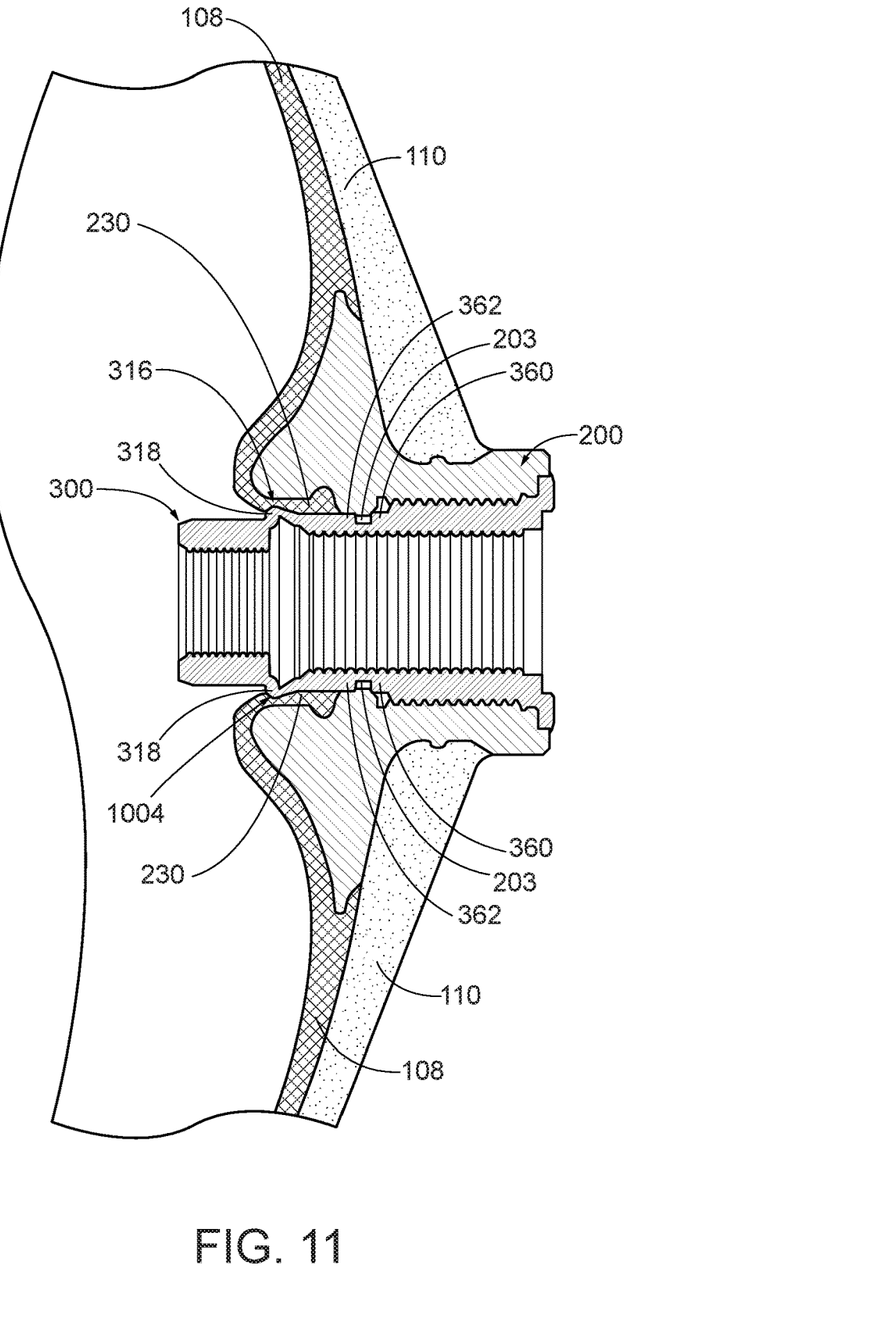
FIG. 11 illustrates an assembly of a bushing with a metal boss integrated into a liner in which a sidewall of the bushing is at a second position.

Turning to FIG. 10 and FIG. 11, the bushing 300 configured to fit inside and couple to the metal boss 200 is illustrated in a first position prior to deformation of the relief space 316 (as depicted in FIG. 10) and in a second position after deformation of the relief space region 316 (as depicted in FIG. 11). FIG. 10 illustrates the bushing 300 fit inside of the metal boss 200, wherein the sidewall 318 of the relief space region 316 is not deformed. FIG. 11 illustrates the bushing 300 fit inside of the metal boss 200, wherein the sidewall 318 of the relief space region 316 is deformed using a technique described above.

It is to be appreciated that a compound (e.g., modified thermoplastic polyethylene-based resin) can be added to the molding process during the integration of the metal boss 200 with the thermoplastic liner of the cylinder 100. Such techniques, compounds, applications, and methods are described in U.S. Provisional Patent Application Ser. No. 62/311,970 filed on Mar. 23, 2016 entitled "BOSS AND LINEAR INTERFACE FOR A PRESSURE VESSEL" and such application is incorporated herein for reference. It is to be appreciated that a compound can be added or applied to a portion of a surface of the metal boss 200 that seals with the thermoplastic liner and/or a portion of a surface of the bushing 300 that seals with the thermoplastic liner.

The subject innovation can be utilized with composite pressure vessels 100 with thermoplastic liner for compressed gases. The vessel can be equipped with a metal boss 200 with unique tightening system between thermoplastic liner and metal boss 200 that uses the bushing 300. Composite pressure vessel 100 comprises thermoplastic liner, which is integrated to the vessel 100 by continuous filament winding process of the fiber. Thermoplastic liner comprises metal parts, which can be used for valve integration from both sides (e.g., ends) or one of the ends can be plugged/sealed/closed.

The subject innovation relates to pressure vessels (e.g., cylinders) and methods of manufacture for cylinders and more particularly, to type IV composite pressure vessels with thermoplastic liners manufactured using blow molding technology and rotational molding technology, wherein a deformation of the bushing 300 provides a special tightening system.

The subject innovation is directed to composite pressure vessels with thermoplastic liner manufactured using blow molding or rotational molding technique. The subject innovation is related to the liner which a metal boss 200 that couples to an operational valve of the vessel. The subject innovation is related to the metal boss 200 of the liner, which includes an internal bushing 300 that is designed to increase a seal between the liner the metal boss 200.

The thermoplastic liner is manufactured using a molding process (e.g., rotational molding process, injection molding, blow molding process, among others), in which the metal boss 200 integrated thereto. Then O-ring 203 is mounted to the metal boss 200 in order to facilitate sealing between the bushing 300. Bushing 300 has thread on its external diameter and two threads on its internal diameter. One of those two threads (with bigger size) can couple to an operational valve, the second thread can be placed in the rear part of the bushing 300 with the smaller size is predicted to apply special tool for riveting process. The bushing 300 can be screwed to the metal boss 200 whereupon its external diameter makes sealing system with the O-ring 203. A tool for riveting process is screwed to the smaller size thread of the bushing 300 and by applying the suitable level of force, the rear part of bushing 300 is pulled and deformed. This causes, that the on the sidewall 318 of the relief space 316 on the bushing 300, the collar is formed. This collar presses the thermoplastic liner to the metal boss 200 eliminating the possible leakage of the composite vessel 100. The thermoplastic liner is ready for the filament winding process in order to make the strong enough structure to withstand internal pressure of the vessel 100.

In an embodiment, the thermoplastic liner is crimped between the sidewall and the metal boss when the sidewall of the relief space region is in the second position. In an embodiment, the cylinder can further comprise a modified thermoplastic polyethylene-based resin that is between the metal boss and the thermoplastic liner, wherein the modified thermoplastic polyethylene-based resin is further compressed for sealing therebetween with the relief space region at the second position.

In an embodiment, the bushing further includes a first internal thread on the internal wall at the second end. In an embodiment, the cylinder can further comprise a tool that releasably couples to the first internal thread to deform the relief space region from the first position to the second position. In the embodiment, the bushing further includes a second internal thread on the internal wall at the first end. In the embodiment, the cylinder can further comprise a valve that is inserted into the through passage of the bushing, wherein the valve includes a thread that couples to the second internal thread on the bushing. In an embodiment, the cylinder can further comprise a wrapping that covers the thermoplastic liner and a portion of the metal boss. In an embodiment, the wrapping is at least one of a carbon fiber, a composite material, a Teflon, or a disparate material from the thermoplastic liner.

In an embodiment, the metal boss includes a first rib on the internal wall and a second rib on the internal wall spaced apart from the first rib and an O-ring positioned in between the first rib and the second rib. In an embodiment, the bushing includes a first rib on the external wall and a second rib on the external wall spaced apart from the first rib and an O-ring positioned in between the first rib and the second rib. In an embodiment, the gas is a compressed natural gas, a hydrogen gas, or a compressed air. In an embodiment, the bushing further comprising a length between the first end and the second end in which the bushing deformed to the second position reduces the length.

In an embodiment, bushing for a cylinder can include a thermoplastic liner that is crimped between the sidewall and the metal boss when the sidewall of the relief space region is in the second position. In the embodiment, the bushing can include a first internal thread on the internal wall at the second end. In the embodiment, the bushing can include a second internal thread on the internal wall at the first end, wherein the second internal thread on the internal wall is configured to couple to a thread of a valve. In the embodiment, the bushing can include a length between the first end and the second end that is reduced with the relief space region deformed to the second position.

The aforementioned systems, components, (e.g., cylinder 100, metal boss 200, bushing 300, tool system 400, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 12:
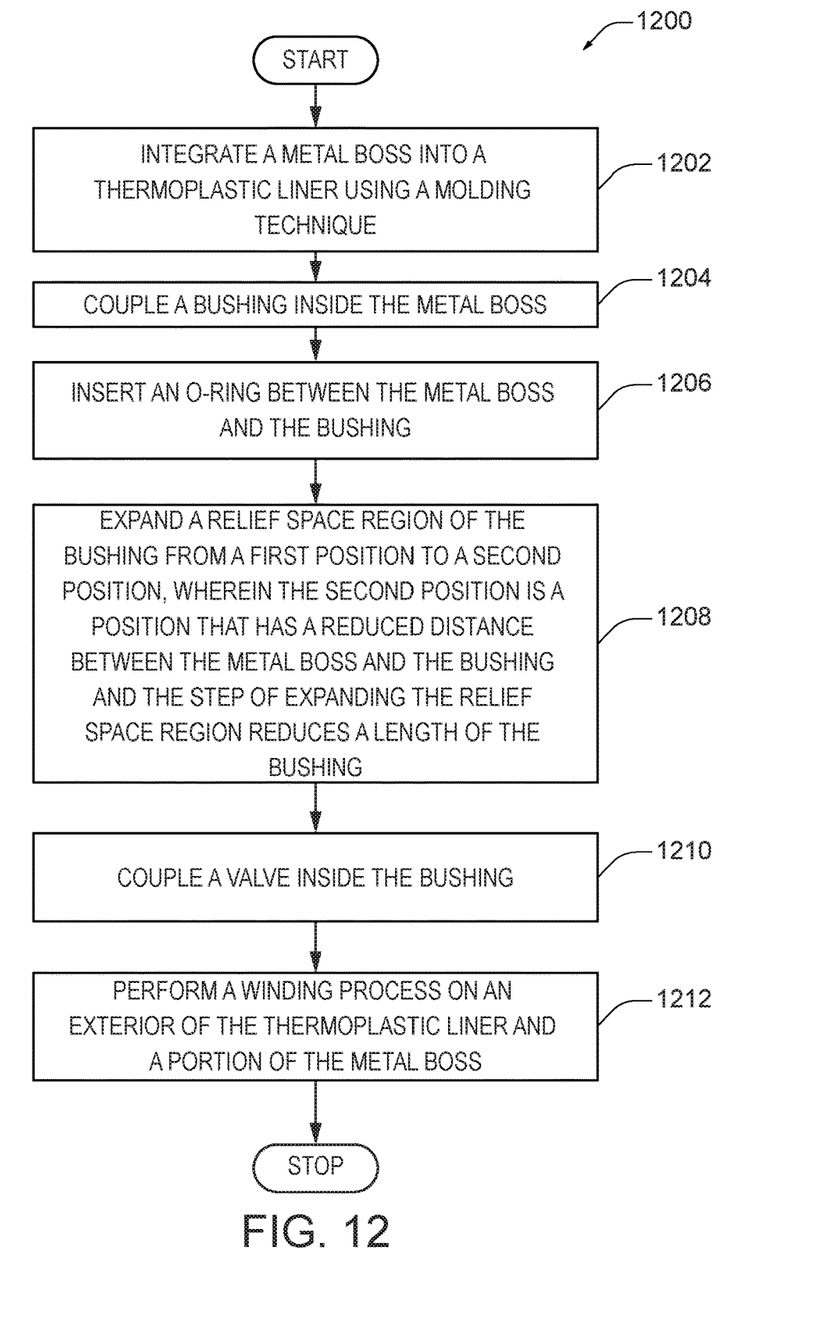
FIG. 12 illustrates a method that facilitates sealing a metal boss to liner of a cylinder to prevent leakage.

In view of the exemplary devices and elements described supra, methodologies that may be implemented in accordance with the disclosed subject matter will be better appreciated with reference to the flow charts of FIG. 12. While for purposes of simplicity of explanation, the methodology shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter. Moreover, such methodology of FIG. 12 can be comprised of one or more methodologies.

Sequentially, the following occurs as illustrated in the decision tree flow diagram 1200 of FIG. 12 which is a flow diagram 1200 that manufactures a cylinder having the metal boss 200 and the bushing 300 as described in FIGS. 1-11. At reference block 1202, a metal boss can be integrated into a thermoplastic liner by using a molding technique. For example, the molding technique can be, but is not limited to, a blow molding technique, a rotating molding technique, an injection molding technique, among others. It is to be appreciated that the molding process can integrate the metal boss 200 into the thermoplastic liner such that a channel region is created proximate to an end of the metal boss. The thermoplastic liner can create the channel region that includes a curved region that connects to a neck region that connects to lip region. In an embodiment, the channel region can be hook or hanger shaped (from a perspective illustrated in FIGS. 10 and 11). Moreover, an inner diameter of an opening to which the metal boss is integrated can be drilled to facilitate receiving the bushing. For example, a portion of the channel region can be trimmed or drilled to a diameter to remove any irregularities from the molding process.

At reference block 1204, a bushing can be coupled to the inside of the metal boss. For example, the bushing can be releasably coupled to the metal boss by a mating a thread on the metal boss with a thread on the bushing. It is to be appreciated that coupling the bushing inside the metal boss can be chosen with sound engineering judgment.

At reference block 1206, an O-ring can be inserted between the metal boss and the bushing. In an embodiment, the O-ring can be placed onto the bushing prior to insertion into the metal boss. For example, the bushing can include one or more ribs in which the O-ring can be placed in between prior to insertion into the metal boss. In the example of one rib, the O-ring can be placed proximate to the rib on the bushing. In another embodiment, the O-ring can be placed into the metal boss. For example, the metal boss can include one or more ribs to which the O-ring can be placed in between prior to receiving the bushing. In the example of one rib, the O-ring can be placed proximate to the rib on the metal boss. It is to be appreciated that the placement of the O-ring can be on a location on a portion of the metal boss, on a location of a portion of the bushing, a combination thereof, and the like. Moreover, the subject innovation can include two or more O-rings to facilitate sealing.

At reference block 1208, a relief space region of the bushing can be expanded from a first position to a second position, wherein the second position is a position that has a reduced distance between the metal boss and the bushing and the step of expanding the relief space region reduces a length of the bushing. In an embodiment, the bushing can be configured receive a longitudinal force that can be applied in a direction from the second end of the bushing to the first end of the bushing. This longitudinal force can cause a decrease in a length of the bushing as well as cause the sidewall to expand outwardly to the second position. It is to be appreciated that a force can be applied to the bushing such that the sidewall of the bushing is deformed or moved from a first position to a second position (as described above).

At reference block 1210, a valve can be coupled inside the bushing. In an embodiment, the valve can include an exterior surface with a threading that mates with a threading on an interior wall of the bushing. At reference numeral 1212, a winding process can be performed on an exterior of the thermoplastic liner and a portion of the metal boss.

In an embodiment, the method can further include applying a compound (e.g., a modified thermoplastic polyethylene-based resin) to the molding process during the integration of the metal boss 200 with the thermoplastic liner of the cylinder 100. Such techniques, compounds, applications, and methods are described in U.S. Provisional Patent Application Ser. No. 62/311,970 filed on Mar. 23, 2016 entitled "BOSS AND LINEAR INTERFACE FOR A PRESSURE VESSEL" and such application is incorporated herein for reference in between the metal boss and the thermoplastic liner prior to using the blow molding technique or the rotational molding technique.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A cylinder configured to house a gas, comprising:
a thermoplastic liner having a closed end and an open end opposite thereto;
a metal boss having a first end, a second end opposite thereto, an internal wall that defines a through passage that extends between the first end and the second end, and an internal thread on a portion of the internal wall, wherein the second end is coupled to the open end of the thermoplastic liner;
a bushing having a first end, a second end opposite thereto, an internal wall that defines a through passage that extends between the first end and the second end, and an external wall having an external thread configured to engage the internal thread of the metal boss for connectivity, wherein the bushing is configured to fit inside the through passage of the metal boss; and
the bushing includes a relief space region having a sidewall at a first position that is deformable to a second position which reduces a distance between the sidewall and the metal boss, wherein the thermoplastic liner is crimped between the sidewall and the metal boss when the sidewall of the relief space region is in the second position.

2. The cylinder of claim 1, further comprising a modified thermoplastic polyethylene-based resin that is between the metal boss and the thermoplastic liner, wherein the modified thermoplastic polyethylene-based resin is further compressed for sealing therebetween with the relief space region at the second position.

3. The cylinder of claim 1, the bushing further includes a first internal thread on the internal wall at the first end.

4. The cylinder of claim 3, further comprising a valve that is inserted into the through passage of the bushing, wherein the valve includes a thread that couples to the first internal thread on the bushing.

5. The cylinder of claim 3, the bushing further includes a second internal thread on the internal wall at the second end.

6. The composite cylinder of claim 5, further comprising a tool that releaseably couples to the second internal thread to deform the relief space region from the first position to the second position.

7. The composite cylinder of claim 1, further comprising a wrapping that covers the thermoplastic liner and a portion of the metal boss.

8. The cylinder of claim 7, wherein the wrapping is at least one of a carbon fiber, a composite material, a Teflon, or a disparate material from the thermoplastic liner.

9. The cylinder of claim 1, further comprising:
the metal boss includes a first rib on the internal wall and a second rib on the internal wall spaced apart from the first rib; and
an O-ring positioned in between the first rib and the second rib.

10. The cylinder of claim 1, further comprising:
the bushing includes a first rib on the external wall and a second rib on the external wall spaced apart from the first rib; and
an O-ring positioned in between the first rib and the second rib.

11. The cylinder of claim 1, wherein the gas is a compressed natural gas, a hydrogen gas, or a compressed air.

12. The cylinder of claim 1, the bushing further comprising a length between the first end and the second end in which the bushing deformed to the second position reduces the length.

13. A bushing for a cylinder, comprising:
a first end, a second end opposite thereto, an internal wall that defines a through passage that extends between the first end and the second end, and an external wall having an external thread configured to engage an internal thread of a metal boss for connectivity, wherein the bushing is configured to fit inside the through passage of the metal boss;
a relief space region having a sidewall at a first position that is deformable to a second position which reduces a distance between the sidewall and the metal boss; and
a length between the first end and the second end that is reduced with the relief space region deformed to the second position.

14. The bushing of claim 13, further comprising a thermoplastic liner that is crimped between the sidewall and the metal boss when the sidewall of the relief space region is in the second position.

15. The bushing of claim 14, further comprising a modified thermoplastic polyethylene-based resin that is between the metal boss and the thermoplastic liner, wherein the modified thermoplastic polyethylene-based resin is further compressed for sealing therebetween with the relief space region at the second position.

16. The bushing of claim 13, further comprising a first internal thread on the internal wall at the first end, wherein the first internal thread on the internal wall is configured to couple to a thread of a valve.

17. The bushing of claim 16, further comprising a second internal thread on the internal wall at the second end.

18. The bushing of claim 17, further comprising a tool that releaseably couples to the second internal thread to deform the relief space region from the first position to the second position.

* * * * *